(12) United States Patent
Chiang et al.

(10) Patent No.: US 8,015,315 B2
(45) Date of Patent: Sep. 6, 2011

(54) COMPRESSION OF IPV6 ADDRESSES IN A NETFLOW DIRECTORY

(75) Inventors: Chuck Chiang, Sunnyvale, CA (US); Sanjeev Mahalawat, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 737 days.

(21) Appl. No.: 11/684,293

(22) Filed: Mar. 9, 2007

(65) Prior Publication Data

US 2008/0222386 A1    Sep. 11, 2008

(51) Int. Cl.
*G06F 15/173*    (2006.01)
(52) U.S. Cl. ...................................... 709/238
(58) Field of Classification Search ............... 709/238
See application file for complete search history.

(56) References Cited

U.S. PATENT DOCUMENTS

| | | | |
|---|---|---|---|
| 6,233,242 B1 * | 5/2001 | Mayer et al. | 370/412 |
| 6,330,557 B1 * | 12/2001 | Chauhan | 707/3 |
| 2003/0103459 A1 * | 6/2003 | Connors et al. | 370/235 |
| 2003/0174705 A1 * | 9/2003 | Shankar et al. | 370/392 |
| 2004/0230696 A1 * | 11/2004 | Barach et al. | 709/238 |

FOREIGN PATENT DOCUMENTS

JP    2004056340 A  *  2/2004

OTHER PUBLICATIONS

Lim et al. 2003. High Speed IP Address Lookup Architecture Using Hashing. IEEE Communications Letters, vol. 7, No. 10, Oct. 2003.*
Yao et al. 2004. A Fast IPv6 Route Lookup Algorithm with Hash Compression. International Conference on Communications, Circuits and Systems, 2004. Jun. 27-29, 2004. vol. 1, pp. 674-677.*
Kostas Pagiamtzis, CAM Primer, last updated Jan. 7, 2005, copyright 2003-2005 Kostas Pagiamtzis, Internet: <http://pagiamtzis.com/cam/camintro.html>.
Slide Notes: Hashing and Hash Tables, 7 pages, downloaded from the Internet: <http://yenigul.net/tpop/handouts/C_Hash_Tables.htm>.

* cited by examiner

*Primary Examiner* — Jeffrey Pwu
*Assistant Examiner* — Saad A Waqas
(74) *Attorney, Agent, or Firm* — Charles E. Krueger

(57) ABSTRACT

Modified flow keys holding compressed IPv6 addresses are stored in a flow table to improve memory utilization. The compressed IPv6 addresses are utilized to access a compression table holding the full IPv6 address, and full IPv6 address are substituted into the modified flow key to form an unmodified flow key.

3 Claims, 5 Drawing Sheets

COMPRESSION OF IPV6 ADDRESSES IN A NETFLOW DIRECTORY

BACKGROUND OF THE INVENTION

In a network switch that performs a flow based lookup, packets are classified into "flows", where a flow defines a particular communication session between two hosts and is defined by IP source and destination addresses and other fields from a packet header received at the network switch.

When a packet is processed at the network switch, its fields are extracted to form a flow key which is used by a lookup process to identify the packet and process the packet based on the control and state maintained for that flow. When a new flow is received a unique flow key is formed that includes source and destination addresses of the hosts and other fields included in packet headers. The flow keys are stored in a memory structure called a flow table. The location in the flow table that stores the flow key is accessed by a hash lookup using an hkey which is an abbreviated version or "hash" of the flow key. A number of different flow keys can be hashed to the same hkey because the hkey is smaller that the flow key.

New flows are created and their flow keys are stored in a flow directory for later lookup. The flow directory is a memory structure that is organized to implement a typical hash structure. A hash lookup can be performed, for example, using a polynomial function to directly compute the memory location in which a new flow should be stored and where existing flows are looked up. Each location in the flow table, called a bucket id, can store N (a positive integer) different flows having flow keys which hash to the same location, where N is an architecture parameter. When any bucket is full, new flows that can potentially be mapped to that bucket will not be added, i.e., the switch runs out of flow capability at that point. When N flow keys are mapped to the same bucket then the bucket is full and no further flow keys can be mapped to the bucket. A properly selected polynomial function can make sure a bucket will not be full unless most (about 80%) of the buckets are full.

TECHNICAL FIELD

The invention relates to the technical field of efficient implementation of net flow tables in memory.

DESCRIPTION OF EXAMPLE EMBODIMENTS

Overview

In an example embodiment, a compressed Ipv6 address is stored as part of a modified flow key in the flow table where the compressed address includes a hash of the Ipv6 address. The compressed Ipv6 address refers to a memory location in a compression table which holds the entire Ipv6 address. The utilization of the compressed Ipv6 address allows efficient use of the bucket in the flow table.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
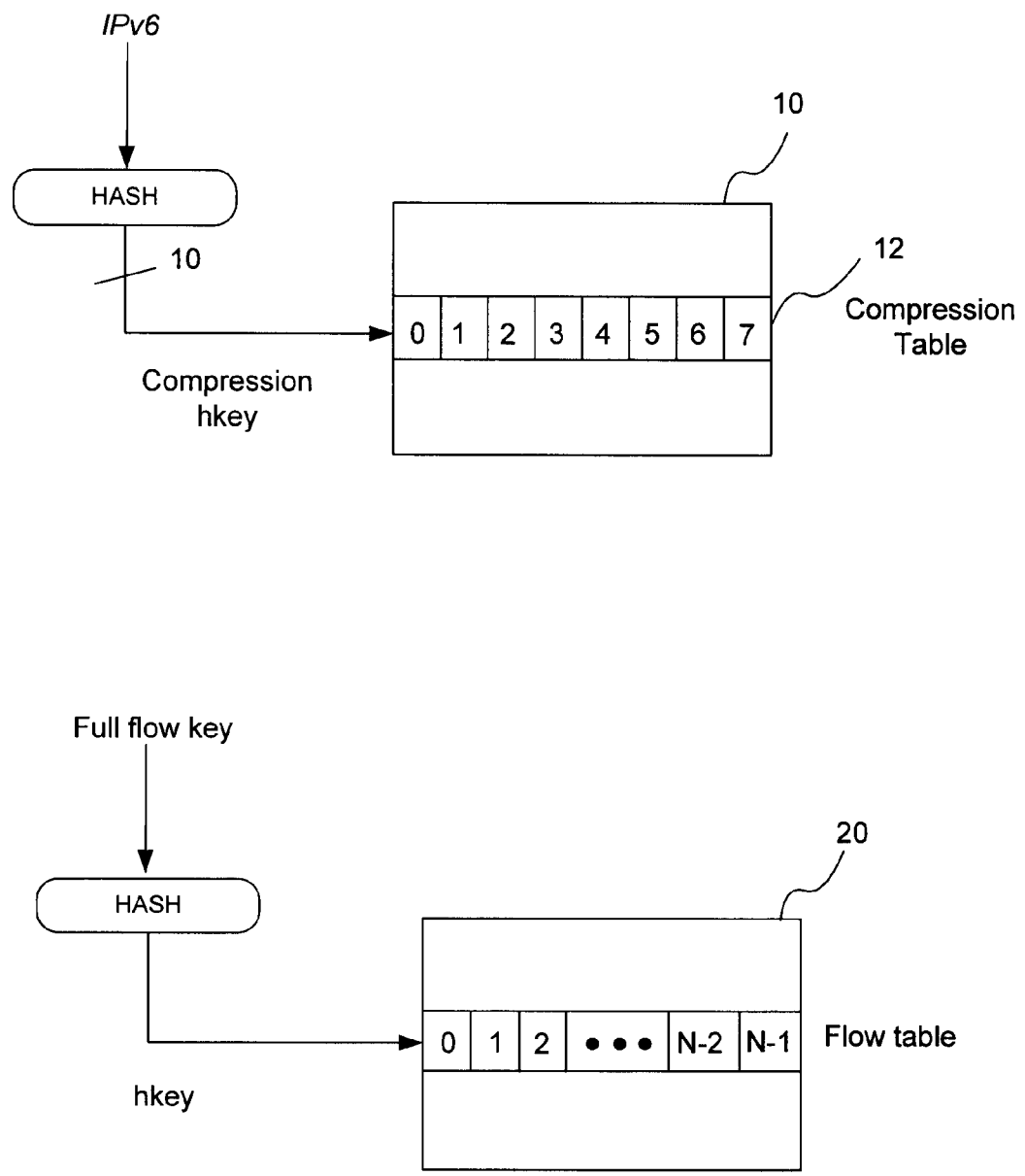
FIG. 1 is a block diagram of an example embodiment.

A first example embodiment is depicted in FIG. 1 which depicts high level views of a compression table 10 and a flow table 20. In this example, a 128-bit Ipv6 address is hashed to a 10-bit compression h-key which is used to access the buckets 12 of the compression table 10. Each bucket includes eight locations for holding 128-bit Ipv6 addresses. As described in more detail below, a 10-bit compression hkey is concatenated with a 3-bit offset to form a 13-bit compression address that identifies the location in the compression table holding a particular Ipv6 address.

The flow table 20 stores a modified, or compressed, flow key having the compression address substituted for the Ipv6 addresses included in the source address and/or destination address fields of packets included in the flow. The modified flow key is stored in the flow table as a substitute for the uncompressed flow key that includes uncompressed source and/or destination Ipv6 addresses.

This modified flow key is held in the bucket of the flow table accessed by the hash of the uncompressed flow key which includes uncompressed IPv6 source and/or destination addresses, derived from a received packet.

Figure 2:
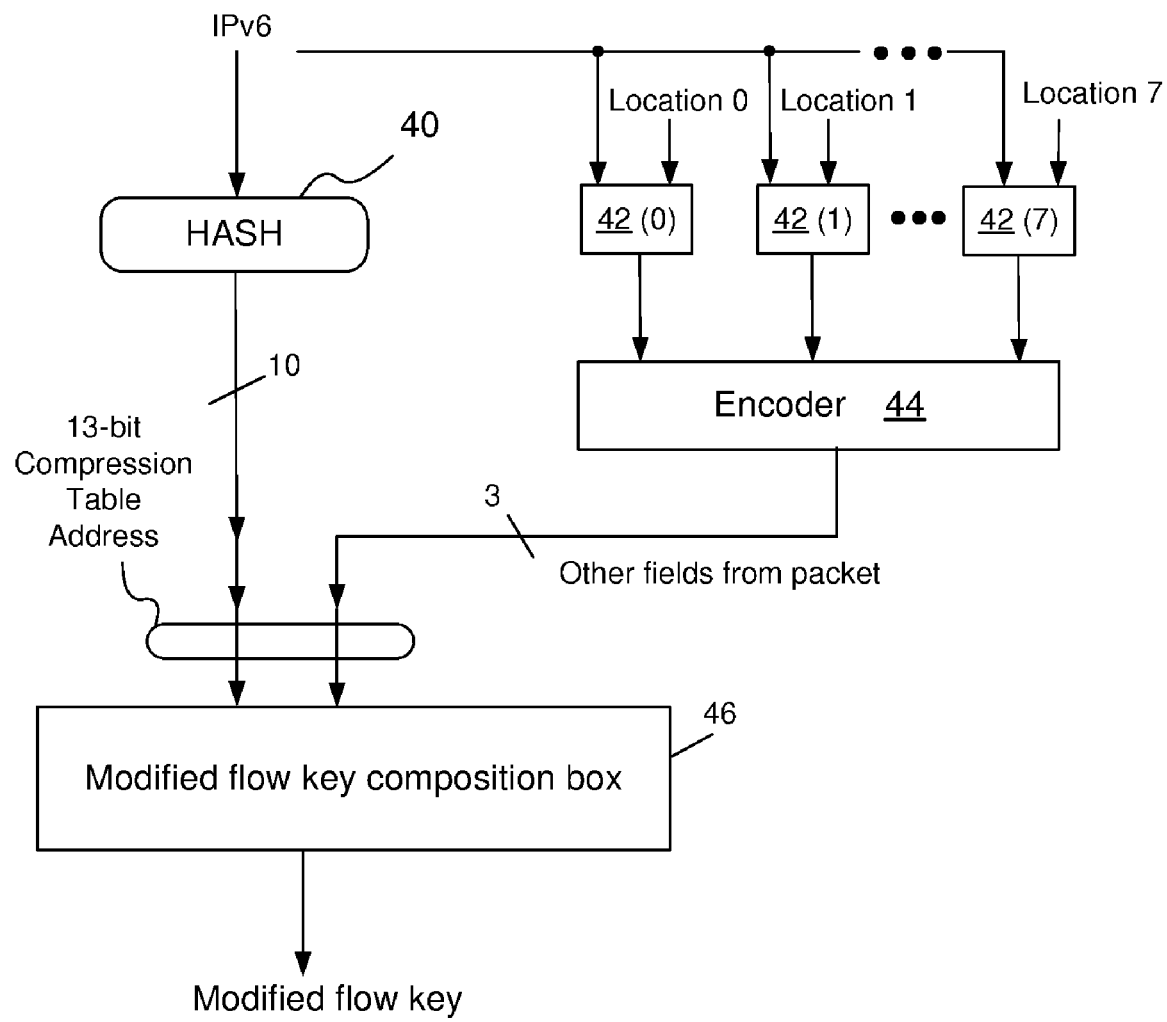
FIG. 2 is a flow chart depicting an example embodiment for creating a modified flow key.
Figure 3:
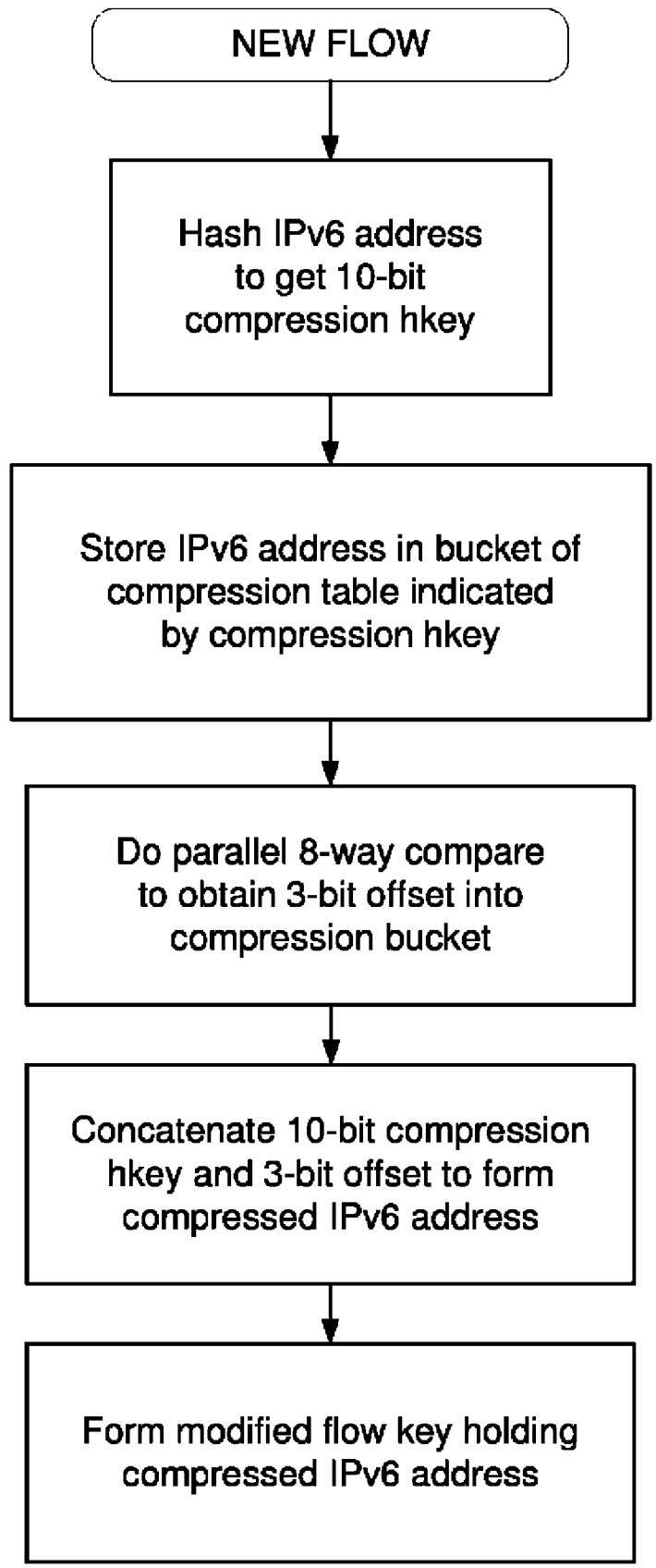
FIG. 3 is flow chart depicting an example of steps performed to generate a modified flow key.

An example of a technique for the generation of the modified flow key for a new flow will now be described with reference to the block diagram of FIG. 2 and the flow chart of FIG. 3. In Ipv6 address held in either the source or destination address fields of a packet of a flow is input to hash generator 40 which outputs a 10-bit compression hkey and the IPv6 address is stored in a location of the bucket indexed by the 10-bit compression hkey. The IPv6 address is also input in parallel to eight comparators 42(0)-(7) which compare the IPv6 address with the contents of each of the eight storage locations in the bucket addressed by the hashed Ipv6 address. Each comparator 42 compares the contents of a respective location with the input Ipv6 address and the comparator that finds the matching stored Ipv6 address outputs a 1 while the other comparators output a 0.

The outputs of the eight comparators 42 are connected in parallel to an encoder 44 which outputs a 3-bit offset address indicating which of the eight locations in the bucket stores the input Ipv6 address. The 10-bit compressed hkey and 3-bit offset address are concatenated to form the compression address of the location holding the input Ipv6 address and the compression address is input to the key composition box 46. The key composition box 46 processes a received compression address and other fields from the packet to form the modified flow key holding the compression address as a replacement for the Ipv6 address.

The modified flow key is stored in the bucket of the flow table accessed by the uncompressed flow key holding the full IPv6 source and/or destination addresses.

Figure 4:
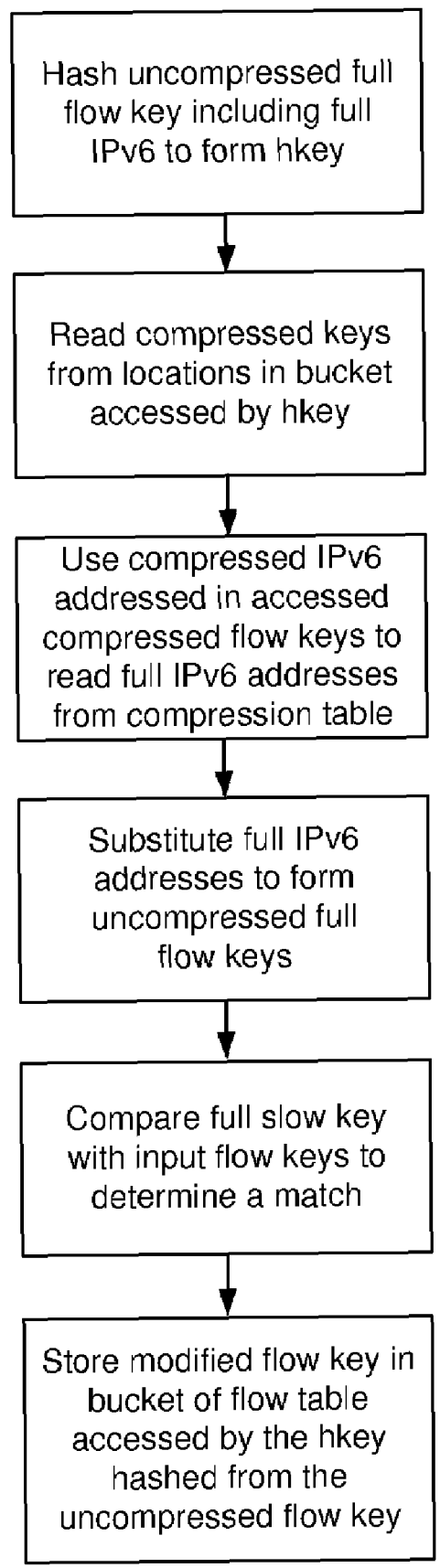
FIG. 4 is a flow chart depicting an example of steps performed to process an input flow key.

The processing of a received packet for an existing flow will now be described with reference to the flow chart of FIG. 4. The input uncompressed flow key of a received packet is hashed and utilized to access a bucket in the flow table. A compressed key is read from each location of an accessed bucket in the flow table and the compressed addresses are utilized to access the corresponding stored uncompressed Ipv6 addresses from the compression table. The uncompressed Ipv6 addresses are then substituted for the compressed Ipv6 addresses to form uncompressed flow keys which are compared to the input uncompressed flow key to determine which of the flow keys stored in the bucket match the input uncompressed flow key.

In the above-described embodiment the 128-bit Ipv6 address has been compressed to a 13-bit address. Although the number of hosts that can be identified has been greatly reduced, analysis of netflow traffic indicates that the 13-bit address can be effectively employed because of the pairing between source and destination hosts in the Net Flow paradigm. For example, although it takes 128 bits to identify IPv6 hosts, not all the hosts will be part of flows that are active in the flow directory at any time. In reality, the total number of hosts represented in the flow directory is significantly smaller than the number specified by 128 bit and can be related to the total number of flows supported.

A flow is a classification of traffic between 2 hosts where N hosts can generate about N×N flows. However, many of the flows in the flow directory carry the same addresses, (A, B), (A, C), (B, A), (B, C), (C, A), (C, B), etc. Therefore, the number of addresses active at any time is approximately the square root of the total number of active flows. In the above embodiment, multiples of that number are supported to take into account deployment scenarios where there are many-to-one connections.

In the above described embodiment, the compression memory can only store a small fraction of the possible Ipv6 address values. As new flows are created the capacity of the compression memory will be exhausted and overflow will occur. To prevent overflow an embodiment utilizes a netflow feature of deleting stale flows to delete stale entries from the compression table.

Figure 5:
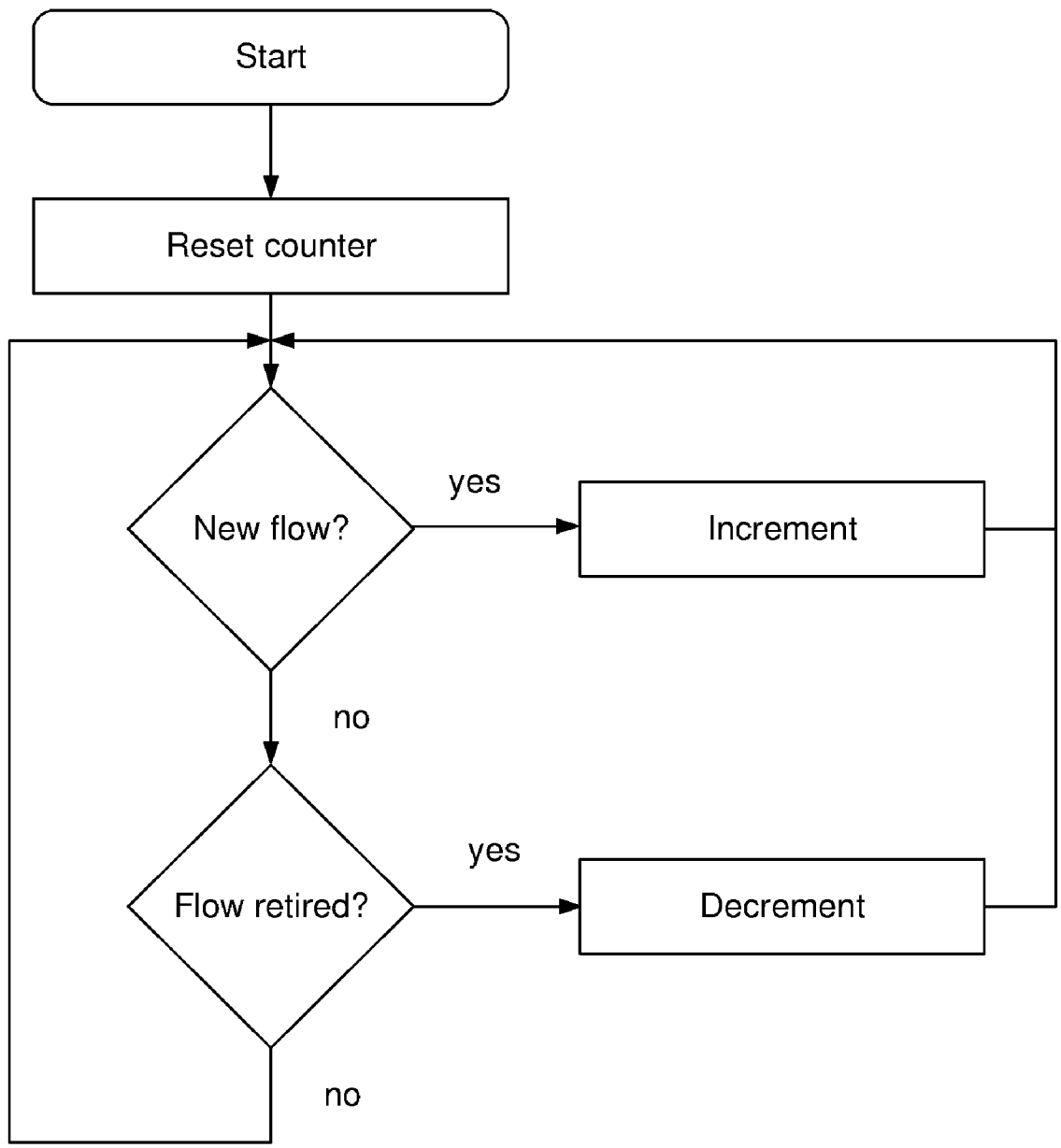
FIG. 5 is flow chart depicting an example of steps performed to retire stale IPv6 addresses.

In this example embodiment depicted in the flow chart of FIG. 5, a counter value is maintained for each location in the compression table. When a new flow causes an IPv6 address to be stored at a location, then the counter for that location is incremented. As subsequent flows are received the counter is incremented each time a flow includes a source or destination address equal to the address stored in the location. Further, the counter is decremented each time a flow including the Ipv6 address stored in the location is retired from the flow table. If the counter value becomes zero then the location is indicated as free so that a new Ipv6 address can be stored in the location.

The implementation of a netflow table utilizing the above embodiments has many advantages. In a standard system, where both IPv4 and IPv6 flows can be mapped into the same bucket, the possibility exists that a single bucket can contain flow keys of mixed lengths, which presents a number of problems. First, if a fixed size memory unit is defined to carry the smaller flow key including 32-bit IPv4 addresses, then three entries are needed to carry ipv6 addresses, resulting in waste of memory because more storage is used than is required by the actual size of the key. Second, if an IPv6 flow key is stored in contiguous units the flow creation and deletion sequence can create a distribution pattern that is fragmented, for example, when there are more than three units in a bucket that are not contiguous. Third, when the flows are predominately IPv6 there are always bucket locations left over that will not be used since N is typically 2 raised to the power of a whole number and not a multiple of 3.

The invention has now been described with reference to the preferred embodiments. Alternatives and substitutions will now be apparent to persons of skill in the art. For example, the number of locations in flow table bucket and the number of bits in the compressed flow key given by way of example and different values may be utilized. Additionally, the principles described above may be extended to other systems that set up connections between pairs of hosts. Accordingly, it is not intended to limit the invention except as provided by the appended claims.

What is claimed is:

1. An apparatus comprising:

a first hashing unit adapted to hash a first received Internet Protocol version 6 (IPv6) address of a new flow, with the first received address included in a first received uncompressed flow key of the new flow, where the full first received IPv6 address is hashed to a first compression hash key having fewer bits than the full IPv6 address, with uncompressed flow keys holding full 128-bit IPv6 addresses;

a compression table, having an address input coupled to receive compression hash keys and having buckets addressed by received compression hash keys, with a selected bucket in the compression table addressed by the first compression hash key and with the selected bucket having a plurality of locations adapted to hold full input IPv6 addresses that are hashed to the first compression hash key by the first hashing unit;

compression address generation logic adapted to combine the first compression hash key with an offset address to form a first compression address, with the offset address indicating which location in the selected bucket of the compression table that holds the full first received IPv6 address and with the compression address having fewer bits than the full IPv6 address and with the compression address generation logic comprising a plurality of comparators, each comparator having a first input coupled to receive the first received IPv6 address, a second input coupled to receive an IPv6 address stored in a location in the selected bucket accessed by the first compression hash key, and having an output for indicating whether IPv6 addresses received at its inputs are the same and an encoder, having inputs coupled to the outputs of the comparators, adapted to output an offset address indicating a location holding an IPv6 address that matches the received IPv6 address;

a modified flow key composition unit, coupled to the compression address generation logic and coupled to receive other fields from the first uncompressed flow key, adapted to compose a first modified flow key by substituting the first compression address for the first full IPv6 included in the first uncompressed flow key;

a second hashing unit adapted to receive the first uncompressed flow key including the first full IPv6 address and to hash the first received uncompressed flow key to a first uncompressed hash key;

a flow table, having an address input coupled to receive the uncompressed hash keys and having buckets addressed by the uncompressed hash keys, with each bucket having a plurality of locations, with the flow table configured to store a modified flow key holding a first compression address instead of a full IPv6 address in a location of a selected bucket indicated by a first uncompressed hash key so that memory requirements of the flow table are reduced because only the first compression address instead of the full IPv6 address are stored in the flow table.

2. The apparatus of claim 1 where:

the modified flow key composition unit concatenates the compression hash key and the offset address to form the first compression address.

3. A method comprising:

hashing a full input Internet Protocol version 6 (IPv6) address, using a first hash generator, with the full input IPv6 address included in an input uncompressed flow key of a received packet in a new flow to output a first compression hash key having fewer bits than the input IPv6 address;

comparing, using a plurality of comparators, full IPv6 addresses held in each location of a selected bucket in a compression table accessed by the first compression hash key with the full input IPv6 address to determine which location in the bucket stores the full input IPv6 address;

encoding the outputs of the plurality of comparators to output an offset address indicating a location holding an IPv6 address that matches the full input IPv6 address;

concatenating, using modified flow key composition logic, the compression hash key and offset address to form a first compression address having fewer bits than a full IPv6 address;

substituting the first compression address, utilizing the modified flow key composition logic, for the full IPv6 address in the input uncompressed flow key to form a modified input flow key;

storing, using the modified key composition logic, the modified input flow key in a location of a selected bucket in a flow table addressed by a first uncompressed hash key so that the modified input flow key instead of the uncompressed flow key holding the full first IPv6 address is stored in the location to save memory, with the flow table having a plurality of buckets addressed by uncompressed hash keys;

hashing an input uncompressed flow key that includes a full IPv6 address, using a second hash generator, to output a first uncompressed hash key that addresses the selected bucket in the flow table;

reading modified flow keys from each location in the selected bucket of the flow table;

accessing full IPv6 addresses from the compression table utilizing the compression hash keys held in the modified flow keys read from each location in the selected bucket of the flow table;

substituting full IPv6 addresses read from the compression table for the compression hash keys held in the modified flow keys to form uncompressed flow keys; and comparing uncompressed flow keys formed by substituting full IPv6 address with the input uncompressed flow key to determine which flow key stored in the selected bucket matches the first uncompressed flow key utilized to access the selected bucket.

* * * * *